United States Patent [19]

Yamamoto et al.

[11] Patent Number: 5,062,982
[45] Date of Patent: Nov. 5, 1991

[54] MAGNETIC POWDER FOR MAGNETIC RECORDING MEDIA

[75] Inventors: Haruhisa Yamamoto, Yokohama; Hidenobu Urata, Kamakura; Tatsuo Kinebuchi, Tokyo; Hidenori Sawabe, Yokohama, all of Japan

[73] Assignee: Nippon Zeon Co., Ltd., Tokyo, Japan

[21] Appl. No.: 505,073

[22] Filed: Apr. 5, 1990

[30] Foreign Application Priority Data

Apr. 7, 1989 [JP] Japan .................................. 1-86962

[51] Int. Cl.$^5$ .............................................. C04B 35/26
[52] U.S. Cl. ............................. 252/62.57; 252/62.58; 252/62.59; 252/62.6; 252/62.62; 252/62.63; 252/62.64; 428/694; 428/900
[58] Field of Search ............... 252/62.57, 62.58, 62.59, 252/62.6, 62.62, 62.63, 62.64; 428/694, 900

[56] References Cited

U.S. PATENT DOCUMENTS

| | | | |
|---|---|---|---|
| 4,341,648 | 7/1982 | Kubo et al. | 252/62.59 |
| 4,407,721 | 10/1983 | Koike et al. | 252/62.59 |
| 4,585,568 | 4/1986 | Nagai et al. | 252/62.59 |
| 4,636,433 | 1/1987 | Kubo et al. | 252/62.59 |
| 4,770,993 | 9/1988 | Kitahata et al. | 252/62.59 |
| 4,781,981 | 11/1988 | Katamoto et al. | 252/62.59 |
| 4,789,494 | 12/1988 | Aoki et al. | 252/62.59 |
| 4,820,433 | 4/1989 | Yamamoto et al. | 252/62.59 |
| 4,828,916 | 5/1989 | Yamamoto et al. | 252/62.59 |
| 4,886,714 | 12/1989 | Torii et al. | 252/62.59 |

FOREIGN PATENT DOCUMENTS

| | | |
|---|---|---|
| 55-86103 | 6/1980 | Japan . |
| 60-157718 | 8/1985 | Japan . |
| 61-168532 | 7/1986 | Japan . |
| 62-207720 | 9/1987 | Japan . |
| 62-216922 | 9/1987 | Japan . |
| 62-235220 | 10/1987 | Japan . |
| 63-64626 | 3/1988 | Japan . |
| 63-146216 | 6/1988 | Japan . |
| 63-193506 | 8/1988 | Japan . |
| 63-193507 | 8/1988 | Japan ............................... 252/62.59 |
| 63-233017 | 9/1988 | Japan ............................... 252/62.59 |
| 63-310730 | 12/1988 | Japan . |
| 1-119517 | 5/1989 | Japan ............................... 252/62.59 |

OTHER PUBLICATIONS

Tadashi Ido et al., "Barium Ferrite Fine Particles for Perpendicular Magnetic Recording Media", Toshiba Review, No. 154, Winter 1985, pp. 10–13.

Primary Examiner—Jack Cooper
Attorney, Agent, or Firm—Lowe, Price, LeBlanc & Becker

[57] ABSTRACT

A magnetic powder for magnetic recording media, which has an average particle diameter of at most 0.1 μm and is represented by the following general composition formula:

$$(Fe)_a(Zr)_b(Si)_c(M^1)_d(M^2)_e(M^3)_f(O)_g$$

wherein $M^1$ means at least one metal element selected from Ba, Sr, Ca and Pb, $M^2$ denotes at least one metal element selected from Mo and W, $M^3$ stands for at least one metal element selected from Mg, Ti, Mn, Ni, Cu, Zn, Sb, La, Al, In, Ce, Nd and Sm, a, b, c, d, e, f and g respectively represent the numbers of Fe, Zr, Si, $M^1$, $M^2$, $M^3$ and O atoms, a is a number of 8.0 to 12.0, b is a number of 0.01 to 6.0, c is a number of 0.05 to 6.0, d is a number of 0.3 to 6.0, e is a number of 0.01 to 6.0, and f is a number of 0.0 to 6.0, and g is the number of oxygen atoms satisfying the atomic valences of the other elements.

5 Claims, No Drawings

MAGNETIC POWDER FOR MAGNETIC RECORDING MEDIA

FIELD OF THE INVENTION

This invention relates to a magnetic powder for magnetic recording media. More specifically, this invention is concerned with a hexagonal ferrite magnetic powder composed of fine particles suitable for use in high-density magnetic recording media. From the magnetic powder according to this invention, magnetic recording media having a desired coercive force can be obtained with high precision.

BACKGROUND OF THE INVENTION

With a demand for higher density in magnetic recording in recent years, the perpendicular magnetic recording method by which a magnetic field is recorded in the thicknesswise direction of a magnetic recording medium has attracted a great deal of attention. The magnetic material used in the perpendicular magnetic recording method must have an easy axis of magnetization in a direction perpendicular to the surface of the recording medium.

Hexagonal ferrites having uniaxitial magnetocrystalline anisotropy, for example, barium ferrite ($BaFe_{12}O_{19}$) magnetic powder, are hexagonal plate crystals, and have an easy axis of magnetization in a direction perpendicular to the plate surface. The plate surface of such a magnetic powder hence tend to become parallel to the surface of a substrate by the mere coating of it. Since its easy axis of magnetization orients in a direction perpendicular to the substrate surface with ease by a magnetic orientation treatment or mechanical orientation treatment, it is suitable for use as a magnetic material for coating film type perpendicular magnetic recording media.

The magnetic materials for the coating film type perpendicular magnetic media must satisfy the following requirements in addition to the fact that they are of a hexagonal system and have uniaxitial magnetocrystalline anisotropy.

Namely, in order to conduct recording, reproducing and erasing to magnetic recording media such as magnetic tapes and floppy disks by a magnetic head, the magnetic powder generally must have a moderate coercive force, Hc, of usually about 200 to 2,000 Oe and the highest possible saturation magnetization, $\sigma s$, of at least 40 emu/g. In addition, its average particle diameter must be at most 0.3 $\mu m$ in view of recording wavelength and at least 0.01 $\mu m$ in view of super paramagnetism. Within this range, at most 0.1 $\mu m$ is preferred in view of noises.

Hexagonal barium ferrite ($BaFe_{12}O_{19}$) magnetic powder known generally has a coercive force of about 5,000 Oe which is too large for a magnetic material for magnetic recording media. Hence, it has been proposed heretofore to reduce the coercive force by substituting a substituting element such as cobalt (Co) for part of the constituent elements of the barium ferrite (see, for example, U.S. Pat. Nos. 4,341,648 and 4,585,568). According to these methods, the coercive force of the hexagonal barium ferrite magnetic powder can be reduced to a coercive force suitable for use as magnetic recording media by controlling the amount of Co substituted (see, for example, Japanese Patent Application Laid-Open No. 86103/1980).

The Co-containing hexagonal barium ferrite magnetic powders whose coercive forces have been controlled by the substitution of Co are however accompanied by a problem that when they are used for magnetic recording media, their coercive forces vary to a great extent. For example, the coercive forces of the Co-containing hexagonal barium ferrite magnetic powders where they have been used as magnetic recording media increases to about at least 1.1 times, and sometimes, about 2.0 times the coercive forces of their corresponding raw magnetic powder used, as shown in Table 1.

TABLE 1

| JPO | Co-containing hexagonal barium ferrite magnetic powder | Coercive force of magnetic powder, Hc (Oe) | Coercive force of magnetic recording medium, Hc (Oe) | Hc of Tape/ Hc of magnetic powder |
|---|---|---|---|---|
| 157718/85 | $Ba_{1.0}Fe_{8.0}Co_{0.40}$ | 1,110 | 1,210 | 1.09 |
| 168532/86 | $Ba_{1.0}Fe_{10.4}Co_{0.80}Ti_{0.80}$ | 845 | 925 | 1.09 |
| 207720/87 | $Ba_{1.0}Fe_{5.73}Co_{0.42}Ti_{0.42}Si_{0.1}$ | 515 | 652 | 1.27 |
| 216922/87 | $Ba_{1.0}Fe_{10.2}Co_{0.9}Ti_{0.45}Sn_{0.45}$ | 550 | 800 | 1.45 |
| 235220/87 | $Ba_{1.0}Fe_{6.93}Co_{0.53}Ti_{0.53}$ | 1,310 | 1,450 | 1.11 |
| 64626/88 | Co-substituted barium ferrite | 550 | 620 | 1.13 |

Note: JPO stands for Japanese Patent Application Laid-Open No.

As shown in Table 1, the coercive forces of the hexagonal barium ferrite magnetic powders containing the elements substituted generally vary when they are formed into magnetic recording media. However, the variation tolerance in coercive force of a magnetic recording medium to be produced must be within (the preset value ±20) Oe, preferably, (the preset value ±10) Oe from the requirements in performance such as output and noises. For this reason, in order to produce a magnetic recording medium having a coercive force of a desired preset value with high precision within (the preset value ±20) Oe, preferably, (the preset value ±10) Oe, it is necessary to make an accurate forecast of a relation between the coercive force of a magnetic powder used and the coercive force of the magnetic recording medium produced therefrom, and to produce and use a magnetic powder having the same coercive force as the forecast value.

This will be described specifically by the magnetic powder in Japanese Patent Application Laid-Open No. 207720/1987 which has been shown in Table 1, as an example. In order to produce a magnetic tape having a preset coercive force of 650 Oe with precision of ±20 Oe, it is necessary to accurately produce a Co-substituted hexagonal barium ferrite magnetic powder having a coercive force of 512±15 Oe in advance.

Although the coercive force of the Co-containing hexagonal barium ferrite magnetic powders can be controlled by changing the content of Co, the coercive force of a resulting magnetic powder considerably varies depending upon changes in content of Co even when the amount changed is extremely small (Nikkei New Material, the Apr. 28, 1986 issue, p. 52). In addition, its coercive force considerably varies depending upon slight changes in conditions of the production process. It is hence very difficult to produce stably a magnetic powder having a desired coercive force within the limited tolerance as described above.

Furthermore, even if a magnetic powder having a desired coercive force can be produced, it is necessary to control the process so as to prevent the coercive force from varying to a great extent upon the production of a magnetic recording medium from the magnetic powder. However, in the case of the Co-containing hexagonal barium ferrite magnetic powder, its coercive force tends to vary greatly upon the production of the magnetic recording medium depending upon the water content, surface ion density and degree of dispersion of the magnetic powder, or the changes of conditions in the production process of the magnetic recording medium. It is hence extremely difficult to produce a magnetic recording medium having the same coercive force as a preset value with high precision.

Hence, various propositions have been made with respect to Co-free magnetic powders for high-density magnetic recording. However, these magnetic powders known conventionally also show variations in coercive force upon the production of magnetic recording media such as magnetic tapes therefrom like the Co-containing magnetic powders.

For example, although Zr-containing barium ferrite magnetic powders making use of zirconium (Zr) as a substituent element have been known (for example, U.S. Pat. Nos. 4,789,494 and 4,781,981), the coercive forces of these magnetic powders vary to an extent as great as ± at least 30 Oe upon the production of magnetic tapes therefrom (Japanese Patent Application Laid-Open No. 146216/1988). In addition, since the average particle diameters of the Zr-containing magnetic powders are as great as at least 0.1 μm, it is insufficient to make a resulting magnetic recording media high density. Furthermore, since their plate ratios are as great as at least 10, they involve a defect that no high charging rate is attained in a coating medium [for example, Toshiba Review, 40 (13), (1985)]. Moreover, the Zr-containing barium ferrite magnetic powders are great in temperature dependence of coercive force (for example, Japanese Patent Application Laid-Open No. 193506/1988) Therefore, the temperature stability in coercive force, which is required for the resulting magnetic tapes, is insufficient. As has been described above, none of the Zr-containing barium ferrite magnetic powders free of Co have properties satisfying the standards required for the magnetic powders for magnetic recording media.

Barium ferrite magnetic powders containing molybdenum (Mo) and/or tungsten (W) as a substituent element have been known (for example, Japanese Patent Application Laid-Open No. 310730/1988). However, these magnetic powders also vary in coercive force to the same extent as in the Co-containing barium ferrite magnetic powders upon production of magnetic tapes therefrom. In addition, since it is difficult to reduce the coercive forces of these magnetic powders containing Mo and/or W to 1000 Oe or lower, a general-purpose ferrite head cannot be used as a magnetic head when these magnetic powders are used magnetic tapes. A particular magnetic head is hence required. Furthermore, since the conventionally-known barium ferrite magnetic powders containing Mo and/or W are great in temperature dependence of coercive force, the temperature stability in coercive force is insufficient. Moreover, their great average particle diameter is accompanied by a defect that resulting magnetic recording media cannot be made high density. As has been described above, the barium ferrite magnetic powders, which are free of Co and contain Mo and/or W, are also insufficient in performance as the magnetic powders for high-density magnetic recording media.

SUMMARY OF THE INVENTION

It is an object of this invention is to provide a magnetic powder which shows little variations in coercive force when used for magnetic recording media such as magnetic tapes and has excellent physical properties.

Another object of this invention is to provide a hexagonal ferrite magnetic powder in which the coercive force can be controlled to a range suitable for use in magnetic recording media, the average particle diameter is small, the temperature dependence of coercive force is little and the plate ratio is small.

A further object of this invention is to provide magnetic recording media making use of the magnetic powder having excellent physical properties as described above.

The present inventors have carried out an extensive investigation with a view toward solving the problems involved in the above-mentioned prior art. As a result, it has been found that a hexagonal ferrite magnetic powder having a specific composition, which is free of Co as a substituent element and contains Zr, Si Mo and/or W, has excellent physical properties capable of attaining the above-described objects. Based on such a finding, the present invention has been led to completion.

Thus, according to this invention, there is provided a magnetic powder for magnetic recording media, which has an average particle diameter of at most 0.1 μm and is represented by the following general composition formula:

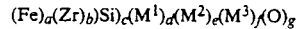

$$(Fe)_a(Zr)_b(Si)_c(M^1)_d(M^2)_e(M^3)_f(O)_g$$

wherein $M^1$ means at least one metal element selected from Ba, Sr, Ca and Pb, $M^2$ denotes at least one metal element selected from Mo and W, $M^3$ stands for at least one metal element selected from Mg, Ti, Mn, Ni, Cu, Zn, Sb, La, Al, In, Ce, Nd and Sm, a, b, c, d, e, f and g respectively represent the numbers of Fe, Zr, Si, $M^1$, $M^2$, $M^3$ and O atoms, a is a number of 8.0 to 12.0, b is a number of 0.01 to 6.0, c is a number of 0.05 to 6.0, d is a number of 0.3 to 6.0, e is a number of 0.01 to 6.0, and f is a number of 0.0 to 6.0, and g is the number of oxygen atoms satisfying the atomic valences of the other elements.

In the general formula, a magnetic powder better in particle size distribution can be obtained by adding the $M^3$ component within a range of 0.1–6.0.

In addition, a magnetic recording medium having a desired coercive force can be stably produced with high precision by using the magnetic powder for magnetic recording media according to this invention.

The magnetic powder according to this invention features that the coercive force can be preset to a desired value within a range of 200–2,000 Oe by controlling the kinds and proportions of the individual constituent elements and the like, the coercive force of a magnetic recording medium produced therefrom is almost the same as that of the magnetic powder as a raw material, and a magnetic recording medium having a desired preset coercive force can be obtained with high precision because of its little variation in coercive force. The magnetic powder of this invention has an average particle diameter of at most 0.1 μm, a plate ratio of at most 8, preferably 2-5 and a temperature dependence of coercive force of at most 1.5 Oe/°C. Since these values are all small, the magnetic powder has excellent physical properties as a magnetic powder for magnetic recording media.

DETAILED DESCRIPTION OF THE INVENTION

Features of the present invention will hereinafter be described in detail.

(Composition)

The magnetic powder according to this invention is a substituted hexagonal ferrite having the composition represented by the above-described general composition formula.

It is critical in this invention that the numbers a to g of the individual constituent elements of the magnetic powder should be within the above-specific ranges. If these numbers are outside the specific ranges, it is difficult to obtain a magnetic powder having coercive force and saturation magnetization suitable for magnetic recording media and an average particle diameter of at most 0.1 μm.

A preferred magnetic powder has such a composition that a is 8.0 to 12.0, b is 0.02 to 4.0, c is 0.1 to 4.0, d is 0.3 to 4.0, e is 0.02 to 4.0 and f is 0.01 to 5.5 and g is the number of oxygen atoms satisfying the atomic valences of the other elements in the general composition formula.

$M^3$ is selected from the above-specified metal elements. Among others, Mn, Ni, Cu, Zn, Al and combinations thereof are preferred.

Depending upon the method of manufacture or the manufacturing conditions, the magnetic powder of this invention may contain particles which are not regular hexagonal plate crystals. But if the numbers of atoms a to g are within the above-specified ranges, the resulting magnetic powder can fully achieve the desired purpose.

Production Method of Magnetic Powder

No particular limitation is imposed on the production method of the magnetic powder of this invention. The magnetic powder of this invention can be obtained by any suitable production method, for example, the coprecipitation method, the flux method, the glass crystallization method, the hydrothermal synthesis method or the like. Among these, the coprecipitation method is particularly preferred because the individual components can be mixed thoroughly, an even ferrite can be obtained and the formation of the ferrite can be conducted at a relatively low temperature.

The production of the magnetic powder according to this invention will be described with reference to the coprecipitation method.

Starting compounds of the individual metal elements constituting the magnetic powder of this invention include, for example, oxides, oxyhydroxides, hydroxides, salts such as ammonium salts, nitrates, sulfates, carbonates, organic acid salts, halides and alkali metal salts, free acids, acid anhydrides and polyacids. Of these, water-soluble compounds are particularly preferred.

Preferably, the starting compound for each metal element is dissolved in water to form an aqueous solution. Where it is convenient to dissolve it in an alkaline aqueous solution, the following alkaline aqueous solutions may be used.

On the other hand, the alkaline component used in the alkaline aqueous solution may be a water-soluble compound. As examples of such a compound, may be mentioned alkali metal hydroxides and carbonates, ammonia and ammonium carbonate. Described specifically, the alkalies used are NaOH, $Na_2Co_3$, $NaHCO_3$, KOH, $K_2CO_3$, $NH_4OH$ and $(NH_4)_2CO_3$ by way of example. A combination of a hydroxide and a carbonate is especially preferred.

The aqueous metal ion solution and the alkaline aqueous solution are then mixed to form a coprecipitate at a pH of at least 5, preferably, at least 8. The resulting coprecipitate is washed with water and then separated by filtration. The resulting cake-like or slurry-like coprecipitate is dried, and fired at 600° to 1,100° C. for 10 minutes to 30 hours to obtain a hexagonal ferrite magnetic powder.

On the other hand, in the case where the co-precipitate is fired in the presence of a flux, a suitable amount of a water-soluble flux (for example, an alkali metal halide such as sodium chloride or potassium chloride, an alkaline earth metal halide such as barium chloride or strontium chloride, sodium sulfate, potassium sulfate, sodium nitrate, potassium nitrate or a mixture thereof) is added to the washed coprecipitate. Water is then evaporated from the mixture of the coprecipitate and the flux. The residue is dried and fired at 600°-1,100° C. for 10 minutes to 30 hours. The water-soluble flux is washed out with water or an acid aqueous solution and the residue is collected by filtration. As required, the residue is further washed with water and then dried to obtain a hexagonal ferrite magnetic powder. Alternatively, the alkali salt formed by coprecipitation may also be used as the flux. In this case, a hexagonal ferrite magnetic powder is obtained by evaporating water from the mixture, which contains the coprecipitate and the alkali salt, as is, without washing it with water to dry it, and subjecting it to the same operation as described above.

The magnetic powder of this invention can be applied onto a substrate by a conventional coating method making use of a resin binder to produce a magnetic recording medium such as a magnetic tape.

ADVANTAGES OF THE INVENTION

According to this invention, when a magnetic recording medium is produced from the magnetic powder of this invention, variations in coercive force is extremely little. Therefore, it is possible to stably produce a magnetic recording medium having a desired coercive force with high precision within (the preset value ±10 Oe). In addition, since the coercive force of the magnetic powder can be preset to a desired value within a range of 200-2,000 Oe, a magnetic powder having a coercive force fit for a general-purpose magnetic head can be obtained with ease. Moreover, since the temperature dependence of the coercive force is as little as at most 1.5 Oe/°C., the stability of the coercive force to temperature changes such as change in atmospheric temperature is excellent. Thus, magnetic recording media having a desired coercive force can be produced with high precision. Furthermore, since the magnetic powder of this invention is obtained in an average particle diameter as small as at most 0.1 μm, it is excellent as a magnetic material for providing high-density magnetic recording media. Since its plate ratio is as small as at most 8, preferably 2–5, a high charging rate can be attained in a coating medium.

These excellent properties are surprising advantages quite unpredictable from the conventionally-known Co-containing hexagonal ferrite magnetic powders, Zr-containing hexagonal ferrite magnetic powders, Mo- and/or W-containing hexagonal ferrite magnetic powder.

EMBODIMENTS OF THE INVENTION

The present invention will hereinafter be described more specifically by the following Examples and Comparative Examples. However, it should be borne in mind that this invention is not limited to the following Examples only.

Measurements of physical properties and others

Various physical properties and characteristics in the Examples and Comparative Examples were measured in accordance with the following methods.

Coercive force and saturation magnetization of magnetic powder

The coercive forces and saturation magnetizations in these examples were measured by using a vibrating sample magnetometer (VSM) at a maximum applied magnetic field of 10 KOe and a measuring temperature of 28° C.

Temperature dependence of coercive force

The coercive forces of the magnetic powders in these examples were measured at varied measuring temperatures of 20° to 100° C. to calculate the temperature dependence (Oe/°C.) of the coercive forces.

Average particle diameter and plate ratio (the ratio of the maximum diameter to the maximum thickness)

The maximum diameters and maximum thickness of 400 particles were measured from a micrograph of the magnetic powder taken through a transmission-type electron microscope to calculate the average particle diameter and the ratio of the maximum diameter to the maximum thickness (hereinafter refer to as "plate ratio") as arithmetic averages.

Particle size distribution ($\sigma gd$)

The above measurements of the particle diameters were arranged using the logarithmic normal distribution to determine the particle size distribution.

Magnetic recording medium

A sample magnetic powder in an amount of 100 parts by weight was mixed thoroughly with 10 parts by weight of a binder for magnetic tap ("MR-110", trade name; product of Nippon Zeon Co., Ltd.), 10 parts by weight of a polyurethane resin, 3 parts by weight of conductive carbon black, 5 parts by weight of high-purity alumina powder, an additive such as stearic acid and a mixed solvent consisting of methyl ethyl ketone, toluene and cyclohexanone to prepare a magnetic coating formulation. The magnetic coating formulation was applied by a roll coater onto a polyester film so that the easy axis of magnetization of the magnetic powder orients in a direction in-plane to the surface of the tape. The thus-coated polyester film was dried and then caused to pass through calender rolls, followed by slitting of the film into halves to obtain magnetic tapes.

Coercive force of magnetic tape

With the magnetic tapes obtained above, the coercive force in a direction perpendicular to the surface of the magnetic tape was measured by using the vibrating sample magnetometer (VSM) at a maximum applied magnetic field of 5 KOe.

Composition formula of magnetic powder

In the composition formula for each magnetic powder in these examples, the atomic ratio of the elements is expressed by that of the elements at the time of preparing the starting materials, and the indication of oxygen is omitted for simplification.

Example 1

$BaCl_2.2H_2O$ 0.28 mole, 0.178 mole of $ZrO(NO_3)_2.2H_2O$ and 2.77 moles of $FeCl_3.6H_2O$ were dissolved in 2.5 liters of purified water to form an aqueous solution (designated A).

NaOH 8.0 moles, 2.2 moles of $Na_2CO_3$, 0.076 mole of $Na_2SiO_3.9H_2O$ and 0.0146 mole of $(NH_4)_6Mo_7O_{24}.4H_2O$ were dissolved in 2.5 liters of purified water to form an aqueous solution (designated B).

While holding both solutions A and B at 30° C., they were mixed with each other, followed by agitation at 30° C. for 30 minutes. The thus-obtained mixture containing coprecipitate was added with 5,000 ml of 1N hydrochloric acid and 60 liters of purified water, followed by agitation at 30° C. for 30 minutes. The mixture was then separated by filtration, and water was evaporated from the mixture, as is, to dryness. The residue was fired at 900° C. for 2 hours in an electric furnace. The resulting fired product was washed with purified water until no soluble material existed. Subsequent filtration and drying gave a ferrite magnetic powder.

The various properties of the resulting ferrite magnetic powder are shown in Table 2.

Examples 2–7

Ferrite magnetic powders shown in Table 2 were prepared by exactly the same method as in Example 1 except that the $M^1$ and $M^2$ components and the compositions were changed as shown in Table 2.

Incidentally, chlorides were used as starting materials for $M^1$ component. Starting materials for the $M^2$ component were ammonium salts and used as a solution in an alkaline aqueous solution.

As apparent from the Table 2, the magnetic powders according to this invention have each a moderate coercive force and hardly show variations in coercive force upon production of magnetic tapes therefrom. In addition, they exhibit excellent properties in all respects such as average particle diameter, particle size distribution, plate ratio and temperature dependence of coercive force.

TABLE 2

| Ex. No. | Composition of magnetic powder (atomic ratio) | Properties of magnetic powder | | | | | | Magnetic tape | |
|---|---|---|---|---|---|---|---|---|---|
| | | Coercive force, Hc (Oe) | Saturation magnetization (emu/g) | Average particle diameter (μm) | Plate ratio | Particle size distribution ($\sigma$gd) | Temperature dependence of coercive force (Oe/°C.) | coercive force, Hc⊥ (Oe) | Variation ratio of coercive forces, Hc⊥/Hc |
| 1 | $Ba_{1.1}Fe_{10.9}Zr_{0.7}Mo_{0.4}Si_{0.3}$ | 585 | 58.2 | 0.06 | 4.3 | 2.36 | 0.8 | 589 | 1.01 |
| 2 | $Ba_{1.1}Fe_{11.3}Zr_{0.3}W_{0.4}Si_{0.4}$ | 957 | 57.8 | 0.06 | 4.8 | 2.35 | 1.0 | 958 | 1.00 |
| 3 | $Ba_{1.1}Fe_{10.7}Zr_{0.8}W_{0.5}Si_{0.4}$ | 535 | 57.9 | 0.06 | 5.0 | 2.37 | 0.9 | 540 | 1.01 |
| 4 | $Ba_{1.0}Fe_{10.9}Zr_{0.5}Mo_{0.6}Si_{0.6}$ | 650 | 57.5 | 0.05 | 3.7 | 2.33 | 0.8 | 652 | 1.00 |
| 5 | $Sr_{1.0}Fe_{10.8}Zr_{0.7}Mo_{0.5}Si_{0.6}$ | 628 | 57.0 | 0.06 | 2.9 | 2.34 | 1.1 | 633 | 1.01 |
| 6 | $Ca_{1.0}Fe_{11.1}Zr_{0.3}Mo_{0.6}Si_{0.5}$ | 830 | 57.2 | 0.05 | 3.5 | 2.40 | 0.7 | 831 | 1.00 |
| 7 | $Pb_{1.0}Fe_{11.3}Zr_{0.5}W_{0.2}Si_{0.7}$ | 710 | 56.9 | 0.05 | 4.5 | 2.38 | 0.6 | 715 | 1.01 |

Examples 8-23

Ferrite magnetic powders shown in Table 3 were prepared by exactly the same method as in Example 1 except that the $M^2$ and $M^3$ components and the compositions were changed as shown in Table 3.

Incidentally, ammonium salts were used as starting materials for $M^2$ component. Starting materials for the $M^3$ component were chlorides for Ti, Zn, Sb and In, and nitrates for the other components. The starting compounds for $M^2$ component were used as a solution in an alkaline aqueous solution.

As apparent from the Table 3, magnetic powders having more even particle size distribution can be provided by adding the $M^3$ component. In addition, these magnetic powders are excellent in all the physical properties.

was used instead of zirconium nitrate and sodium metasilicate. Besides, a magnetic powder was prepared by exactly the same method as in Example 1 except that Zr, Si, $M^2$ and $M^3$ components were omitted and Co-Ti were substituted for part of Fe.

The compositions and physical properties of the magnetic powder thus obtained are shown in Table 4.

Comparative Examples 4-9

Magnetic powders were prepared by exactly the same method as in Example 1 except that the compositions were changed to those corresponding to the compositions in Examples of U.S. Pat. No. 4,789,494, Japanese Patent Application Laid-Open Nos. 310730/1988 and 146216/1988.

The compositions and physical properties of the magnetic powders thus obtained are shown in Table 4.

TABLE 3

| Ex. No. | Composition of magnetic powder (atomic ratio) | Properties of magnetic powder | | | | | | Magnetic tape | |
|---|---|---|---|---|---|---|---|---|---|
| | | Coercive force, Hc (Oe) | Saturation magnetization (emu/g) | Average particle diameter (μm) | Plate ratio | Particle size distribution ($\sigma$gd) | Temperature dependence of coercive force (Oe/°C.) | coercive force, Hc⊥ (Oe) | Variation ratio of coercive forces, Hc⊥/Hc |
| 8 | $Ba_{1.1}Fe_{10.7}Zr_{0.5}Mo_{0.6}Ni_{0.2}Si_{0.5}$ | 670 | 57.7 | 0.05 | 3.2 | 2.19 | 1.0 | 675 | 1.01 |
| 9 | $Ba_{1.1}Fe_{10.7}Zr_{0.7}Mo_{0.3}Mn_{0.3}Si_{0.6}$ | 595 | 57.2 | 0.06 | 4.2 | 2.22 | 0.8 | 600 | 1.01 |
| 10 | $Ba_{1.1}Fe_{10.3}Zr_{0.9}Mo_{0.5}Cu_{0.3}Si_{0.3}$ | 630 | 56.9 | 0.06 | 3.7 | 2.21 | 0.8 | 631 | 1.00 |
| 11 | $Ba_{1.1}Fe_{10.8}Zr_{0.6}W_{0.2}Zn_{0.4}Si_{0.4}$ | 720 | 57.3 | 0.05 | 2.9 | 2.22 | 0.9 | 720 | 1.00 |
| 12 | $Ba_{1.1}Fe_{11.0}Zr_{0.5}W_{0.4}Al_{0.1}Si_{0.7}$ | 753 | 57.6 | 0.07 | 5.0 | 2.20 | 0.6 | 755 | 1.00 |
| 13 | $Ba_{1.1}Fe_{10.5}Zr_{1.0}W_{0.2}Mg_{0.3}Si_{0.4}$ | 617 | 57.2 | 0.06 | 3.5 | 2.30 | 0.7 | 619 | 1.00 |
| 14 | $Ba_{1.1}Fe_{10.0}Zr_{1.5}W_{0.3}La_{0.2}Si_{0.8}$ | 583 | 56.8 | 0.05 | 3.0 | 2.29 | 1.0 | 587 | 1.01 |
| 15 | $Ba_{1.1}Fe_{10.0}Zr_{1.2}Mo_{0.5}Ti_{0.3}Si_{0.7}$ | 605 | 57.0 | 0.05 | 4.3 | 2.27 | 0.7 | 606 | 1.00 |
| 16 | $Ba_{1.1}Fe_{9.8}Zr_{2.0}Mo_{0.1}Sb_{0.1}Si_{0.9}$ | 547 | 56.5 | 0.06 | 4.7 | 2.29 | 0.5 | 551 | 1.01 |
| 17 | $Ba_{1.1}Fe_{9.9}Zr_{1.2}Mo_{0.7}In_{0.2}Si_{0.4}$ | 638 | 57.8 | 0.06 | 4.5 | 2.25 | 0.9 | 639 | 1.00 |
| 18 | $Ba_{1.1}Fe_{10.2}Zr_{0.8}Mo_{0.8}Ce_{0.2}Si_{0.5}$ | 717 | 57.4 | 0.06 | 3.9 | 2.28 | 0.4 | 719 | 1.00 |
| 19 | $Ba_{1.1}Fe_{10.1}Zr_{1.1}Mo_{0.6}Nd_{0.2}Si_{0.3}$ | 592 | 58.0 | 0.05 | 3.3 | 2.25 | 1.0 | 597 | 1.01 |
| 20 | $Ba_{1.1}Fe_{10.2}Zr_{1.0}W_{0.5}Sm_{0.3}Si_{0.3}$ | 609 | 57.6 | 0.06 | 4.5 | 2.28 | 1.2 | 615 | 1.01 |
| 21 | $Ba_{1.1}Fe_{10.8}Zr_{0.5}W_{0.2}Ni_{0.2}Ti_{0.3}Si_{0.4}$ | 681 | 57.5 | 0.05 | 2.9 | 2.28 | 0.8 | 685 | 1.01 |
| 22 | $Ba_{1.1}Fe_{10.9}Zr_{0.3}Mo_{0.5}Mn_{0.2}Al_{0.1}Si_{0.4}$ | 723 | 57.8 | 0.07 | 5.0 | 2.20 | 0.8 | 723 | 1.00 |
| 23 | $Ba_{1.1}Fe_{10.5}Zr_{0.7}Mo_{0.4}Cu_{0.2}La_{0.2}Si_{0.3}$ | 655 | 57.8 | 0.06 | 4.4 | 2.29 | 0.9 | 657 | 1.00 |

Comparative Examples 1-3

Magnetic powders were prepared by exactly the same method as in Example 1 except that cobalt nitrate It is understood from Table 4 that the magnetic powders in these comparative examples show considerable variations in coercive force upon production of magnetic tapes therefrom.

TABLE 4

| Comp. Ex. No. | Composition of magnetic powder (atomic ratio) | Properties of magnetic powder | | | | | | Magnetic tape | |
|---|---|---|---|---|---|---|---|---|---|
| | | Coercive force, Hc (Oe) | Saturation magnetization (emu/g) | Average particle diameter (μm) | Plate ratio | Particle size distribution ($\sigma$gd) | Temperature dependence of coercive force (Oe/°C.) | coercive force, Hc⊥ (Oe) | Variation ratio of coercive forces, Hc⊥/Hc |
| 1 | $Ba_{1.1}Fe_{10.6}Co_{0.7}Mo_{0.7}$ | 835 | 54.7 | 0.13 | 10.8 | 3.51 | 5.6 | 1010 | 1.21 |
| 2 | $Ba_{1.1}Fe_{10.6}Co_{0.8}W_{0.6}$ | 787 | 54.3 | 0.12 | 10.0 | 3.45 | 5.3 | 976 | 1.24 |
| 3 | $Ba_{1.1}Fe_{10.5}Co_{0.75}Ti_{0.75}$ | 752 | 56.0 | 0.10 | 5.9 | 3.50 | 5.5 | 1033 | 1.37 |
| 4 | $Ba_{1.0}Fe_{10.8}Zr_{0.6}Zn_{0.6}$ | 723 | 54.0 | 0.12 | 8.7 | 3.53 | 5.2 | 658 | 0.91 |
| 5 | $Ba_{1.0}Fe_{10.8}Zr_{0.6}Ni_{0.6}$ | 730 | 49.8 | 0.11 | 7.5 | 3.50 | 5.4 | 672 | 0.92 |

TABLE 4-continued

| Comp. Ex. No. | Composition of magnetic powder (atomic ratio) | Properties of magnetic powder | | | | | | Magnetic tape | |
|---|---|---|---|---|---|---|---|---|---|
| | | Coercive force, Hc (Oe) | Saturation magnetization (emu/g) | Average particle diameter (μm) | Plate ratio | Particle size distribution (σgd) | Temperature dependence of coercive force (Oe/°C.) | coercive force, Hc⊥ (Oe) | Variation ratio of coercive forces, Hc⊥/Hc |
| 6 | $Ba_{1.0}Fe_{10.8}Zr_{0.6}Mn_{0.6}$ | 812 | 57.3 | 0.14 | 11.7 | 3.56 | 5.4 | 747 | 0.92 |
| 7 | $Ba_{0.76}Fe_{11.43}Zr_{0.47}Cu_{0.1}$ | 796 | 52.2 | 0.12 | 9.1 | 3.48 | 2.3 | 763 | 0.96 |
| 8 | $Ba_{1.0}Fe_{10.4}Zn_{0.4}Mo_{0.72}$ | 1115 | 59.5 | 0.13 | 8.9 | 3.52 | 3.0 | 992 | 0.89 |
| 9 | $Ba_{1.0}Fe_{10.4}Zn_{0.4}W_{0.72}$ | 1162 | 59.2 | 0.12 | 10.4 | 3.53 | 2.8 | 1057 | 0.91 |

Example 24

$BaCl_2 \cdot 2H_2O$ 0.55 mole, 0.3 mole of $ZrO(NO_3)_2 \cdot 2H_2O$ and 5.05 moles of $FeCl_3 \cdot 6H_2O$ were dissolved in 10 liters of distilled water in this sequence to form an aqueous solution A.

NaOH 17.5 moles, 4.72 moles of $Na_2CO_3$, 0.15 mole of $Na_2SiO_3 \cdot 9H_2O$ and 0.0357 mole of $(NH_4)_6Mo_7O_{24} \cdot 4H_2O$ were dissolved in 15 liters of distilled water at room temperature to form an aqueous solution B.

The solution B was gradually added to the solution A heated at 50° C., and the mixture was then stirred at 50° C. for 16 hours.

The thus-obtained coprecipitate was separated by filtration, washed thoroughly with water, dried at 150° C. and fired at 890° C. for 2 hours in an electric furnace.

The ferrite magnetic powder thus obtained is represented by the following composition formula:

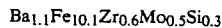

$Ba_{1.1}Fe_{10.1}Zr_{0.6}Mo_{0.5}Si_{0.3}$

The magnetic powder had a coercive force of 850 Oe, a saturation magnetization of 58.5 emu/g, an average particle diameter of 0.06 μm, a plate ratio of 4.1, a particle size distribution (σgd) of 2.35 and a temperature dependence of coercive force of 1.1 Oe/°C. A magnetic tape produced from the magnetic powder had a coercive force (in a direction perpendicular to the surface of the tape) of 856 Oe.

Example 25

$BaCl_2 \cdot 2H_2O$ 0.55 mole, 0.35 mole of $ZrO(NO_3)_2 \cdot 2H_2O$ and 5.5 moles of $FeCl_3 \cdot 6H_2O$ were dissolved in 10 liters of distilled water in this sequence to obtain an aqueous solution A.

NaOH 17.5 moles, 4.72 moles of $Na_2CO_3$, 0.2 mole of $Na_2SiO_3 \cdot 9H_2O$ and 0.0125 mole of $(NH_4)_{10}W_{12}O_{41} \cdot 5H_2O$ were dissolved in 15 liters of distilled water at room temperature to obtain an aqueous solution B.

The solution B was gradually added to the solution A heated at 50° C., and the mixture was then stirred at 50° C. for 16 hours. The thus-obtained coprecipitate was separated by filtration and washed with water. The resulting cake-like coprecipitate slurry was added with 400 g of NaCl as a flux, and after thorough mixing, water was evaporated from the mixture to dryness. The residue was fired at 900° C. for 2 hours in an electric furnace.

The resulting fired product was washed with water until no soluble material existed, and then separated by filtration and dried. The barium ferrite magnetic powder thus obtained is represented by the following composition formula:

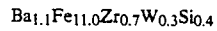

$Ba_{1.1}Fe_{11.0}Zr_{0.7}W_{0.3}Si_{0.4}$

The magnetic powder had a coercive force of 630 Oe, a saturation magnetization of 59.3 emu/g, an average particle diameter of 0.06 μm, a plate ratio of 4.5, a particle size distribution (σgd) of 2.33 and a temperature dependence of coercive force of 0.9 Oe/°C. A magnetic tape produced from the magnetic powder had a coercive force (in a direction perpendicular to the surface of the tape) of 633 Oe.

Examples 26-29

Barium ferrite magnetic powders shown in Table 5 were prepared by exactly the same method as in Example 25 except that the $M^2$ component, the compositions and the flux were changed as shown in Table 5.

Physical properties of the magnetic powders thus obtained are shown in Table 5.

TABLE 5

| Ex. No. | Composition of magnetic powder (atomic ratio) | Flux | Properties of magnetic powder | | |
|---|---|---|---|---|---|
| | | | Coercive force, Hc (Oe) | Saturation magnetization (emu/g) | Average particle diameter (μm) |
| 26 | $Ba_{1.1}Fe_{10.6}Zr_{0.9}Mo_{0.5}Si_{0.7}$ | $BaCl_2$ $2H_2O$ 400 g | 605 | 58.9 | 0.06 |
| 27 | $Ba_{1.1}Fe_{9.9}Zr_{1.3}W_{0.8}Si_{0.9}$ | KCl 250 g/NaCl 200 g | 800 | 57.9 | 0.06 |
| 28 | $Ba_{1.1}Fe_{10.7}Zr_{0.8}W_{0.5}Si_{0.5}$ | NaCl 300 g/$Na_2SO_4$ 200 g | 835 | 58.1 | 0.05 |
| 29 | $Ba_{1.1}Fe_{11.0}Zr_{0.5}Mo_{0.5}Si_{1.1}$ | NaCl 300 g/KCl 100 g | 775 | 57.7 | 0.06 |

| Ex. No. | Properties of magnetic powder | | | Magnetic tape | |
|---|---|---|---|---|---|
| | Plate ratio | Particle size distribution (σgd) | Temperature dependence of coercive force (Oe/°C.) | coercive force, Hc⊥ (Oe) | Variation ratio of coercive forces, Hc⊥/Hc |
| 26 | 4.1 | 2.32 | 0.7 | 607 | 1.00 |
| 27 | 3.3 | 2.35 | 0.7 | 810 | 1.01 |
| 28 | 2.9 | 2.35 | 1.0 | 839 | 1.00 |
| 29 | 4.3 | 2.36 | 0.9 | 775 | 1.00 |

Examples 30-45

Ferrite magnetic powders shown in Table 6 were prepared by exactly the same method as in Example 1 except that the $M^1$, $M^2$ and $M^3$ components and the compositions were changed as shown in Table 6.

Incidentally, chlorides were used as starting materials for $M^1$ component. Starting materials for the $M^2$ component were ammonium salts and starting materials for the $M^3$ component were chlorides for Ti, Zn, Sb and In, and nitrates for the other components.

As apparent from the Table 6, magnetic powders having more even particle size distribution can be provided by adding the $M^3$ component. In addition, these magnetic powders are excellent in all the physical properties.

TABLE 6

| | | Properties of magnetic powder | | | | | | Magnetic tape | |
|---|---|---|---|---|---|---|---|---|---|
| Ex. No. | Composition of magnetic powder (atomic ratio) | Coercive force, Hc (Oe) | Saturation magnetization (emu/g) | Average particle diameter (μm) | Plate ratio | Particle size distribution (σgd) | Temperature dependence of coercive force (Oe/°C.) | coercive force, Hc⊥ (Oe) | Variation ratio of coercive forces, Hc⊥/Hc |
| 30 | $Ba_{1.1}Fe_{10.4}Zr_{0.8}Mo_{0.5}Al_{0.3}Si_{0.5}$ | 724 | 57.2 | 0.06 | 4.0 | 2.18 | 0.8 | 727 | 1.00 |
| 31 | $Ba_{1.1}Fe_{10.2}Zr_{1.0}W_{0.5}Ni_{0.3}Si_{0.3}$ | 591 | 56.8 | 0.07 | 5.1 | 2.22 | 1.2 | 599 | 1.01 |
| 32 | $Ba_{1.1}Fe_{10.3}Zr_{0.8}Mo_{0.7}Zn_{0.2}Si_{0.6}$ | 707 | 57.3 | 0.05 | 4.3 | 2.20 | 0.7 | 707 | 1.00 |
| 33 | $Ba_{1.1}Fe_{10.6}Zr_{0.6}W_{0.4}Mn_{0.4}Si_{0.8}$ | 781 | 57.8 | 0.05 | 3.7 | 2.27 | 0.7 | 785 | 1.01 |
| 34 | $Ba_{1.1}Fe_{10.7}Zr_{0.6}W_{0.3}Cu_{0.4}Si_{0.6}$ | 812 | 58.0 | 0.06 | 4.8 | 2.19 | 1.0 | 813 | 1.00 |
| 35 | $Ba_{1.1}Fe_{10.4}Zr_{0.7}Mo_{0.6}Al_{0.1}Cu_{0.2}Si_{0.5}$ | 756 | 57.6 | 0.06 | 3.9 | 2.21 | 1.1 | 757 | 1.00 |
| 36 | $Ba_{1.1}Fe_{10.1}Zr_{1.1}Mo_{0.4}Zn_{0.3}Mn_{0.1}Si_{0.4}$ | 577 | 56.8 | 0.06 | 4.3 | 2.21 | 0.5 | 580 | 1.01 |
| 37 | $Ba_{1.1}Fe_{10.5}Zr_{0.8}W_{0.3}Cu_{0.2}Ni_{0.2}Si_{0.6}$ | 731 | 57.3 | 0.05 | 4.5 | 2.25 | 0.9 | 733 | 1.00 |
| 38 | $Ba_{1.1}Fe_{10.6}Zr_{0.5}W_{0.5}Mn_{0.3}Al_{0.1}Si_{0.7}$ | 850 | 57.9 | 0.05 | 2.9 | 2.20 | 0.5 | 850 | 1.00 |
| 39 | $Ba_{1.1}Fe_{10.4}Zr_{0.7}W_{0.4}Zn_{0.1}Ni_{0.4}Si_{0.6}$ | 808 | 57.5 | 0.06 | 4.8 | 2.18 | 1.2 | 810 | 1.00 |
| 40 | $Ba_{1.1}Fe_{10.1}Zr_{0.9}Mo_{0.5}Ni_{0.3}Al_{0.2}Si_{0.7}$ | 673 | 57.0 | 0.05 | 3.7 | 2.22 | 0.4 | 677 | 1.01 |
| 41 | $Ba_{1.1}Fe_{10.5}Zr_{0.6}Mo_{0.4}Cu_{0.3}Zn_{0.2}Si_{0.5}$ | 771 | 57.8 | 0.07 | 4.0 | 2.23 | 0.5 | 771 | 1.00 |
| 42 | $Ba_{1.1}Fe_{10.4}Zr_{0.8}W_{0.3}Mn_{0.4}Cu_{0.1}Si_{0.8}$ | 710 | 57.4 | 0.06 | 3.3 | 2.19 | 0.7 | 714 | 1.01 |
| 43 | $Sr_{1.0}Fe_{10.5}Zr_{0.9}W_{0.4}Ni_{0.2}Si_{0.8}$ | 569 | 56.1 | 0.06 | 2.8 | 2.26 | 0.9 | 573 | 1.01 |
| 44 | $Ca_{1.0}Fe_{10.9}Zr_{0.3}W_{0.5}Al_{0.3}Si_{0.5}$ | 886 | 56.3 | 0.06 | 4.6 | 2.25 | 1.0 | 889 | 1.00 |
| 45 | $Pb_{1.0}Fe_{10.7}Zr_{0.5}Mo_{0.6}Cu_{0.2}Si_{0.6}$ | 760 | 57.0 | 0.06 | 4.1 | 2.27 | 0.9 | 765 | 1.01 |

What is claimed is:

1. A hexagonal ferrite magnetic powder for magnetic recording media, which has an average particle diameter of at most 0.1 μm, a plate ratio of maximum diameter to maximum thickness of at most 8 and a temperature dependence of coercive force of at most 1.5 Oe/°C. in the temperature range of 20°-100° C. and is represented by the following general composition formula:

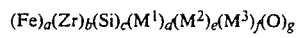

$$(Fe)_a(Zr)_b(Si)_c(M^1)_d(M^2)_e(M^3)_f(O)_g$$

wherein $M^1$ means at least one metal element selected from Ba, Sr, Ca and Pb, $M^2$ denotes at least one metal element selected from Mo and W, $M^3$ stands for at least one metal element selected from Mg, Ti, Mn, Ni, Cu, Zn, Sb, La, Al, In, Ce, Nd and Sm, a, b, c, d, e, f and g respectively represent the numbers of Fe, Zr, Si, $M^1$, $M^2$, $M^3$ and O atoms, a is a number of 8.0 to 12.0, b is a number of 0.01 to 6.0, c is a number of 0.05 to 6.0, d is a number of 0.3 to 6.0, e is a number of 0.01 to 6.0, and f is a number of 0.0 to 6.0, and g is the number of oxygen atoms satisfying the atomic valence of the other elements.

2. The magnetic powder of claim 1, wherein f is a number of 0.01 to 6.0.

3. The magnetic powder of claim 1, wherein a is a number of 8.0 to 12.0, b is a number of 0.02 to 4.0, c is a number of 0.1 to 4.0, d is a number of 0.3 to 4.0, e is a number of 0.02 to 4.0, and f is a number of 0.01 to 5.5, and g is the number of oxygen atoms satisfying the atomic valences of the other elements.

4. The magnetic powder of claim 1, wherein $M^3$ is at least one metal element selected from Mn, Ni, Cu, Zn and Al.

5. A magnetic recording medium comprising the magnetic powder of claim 1.

* * * * *